UNITED STATES PATENT OFFICE.

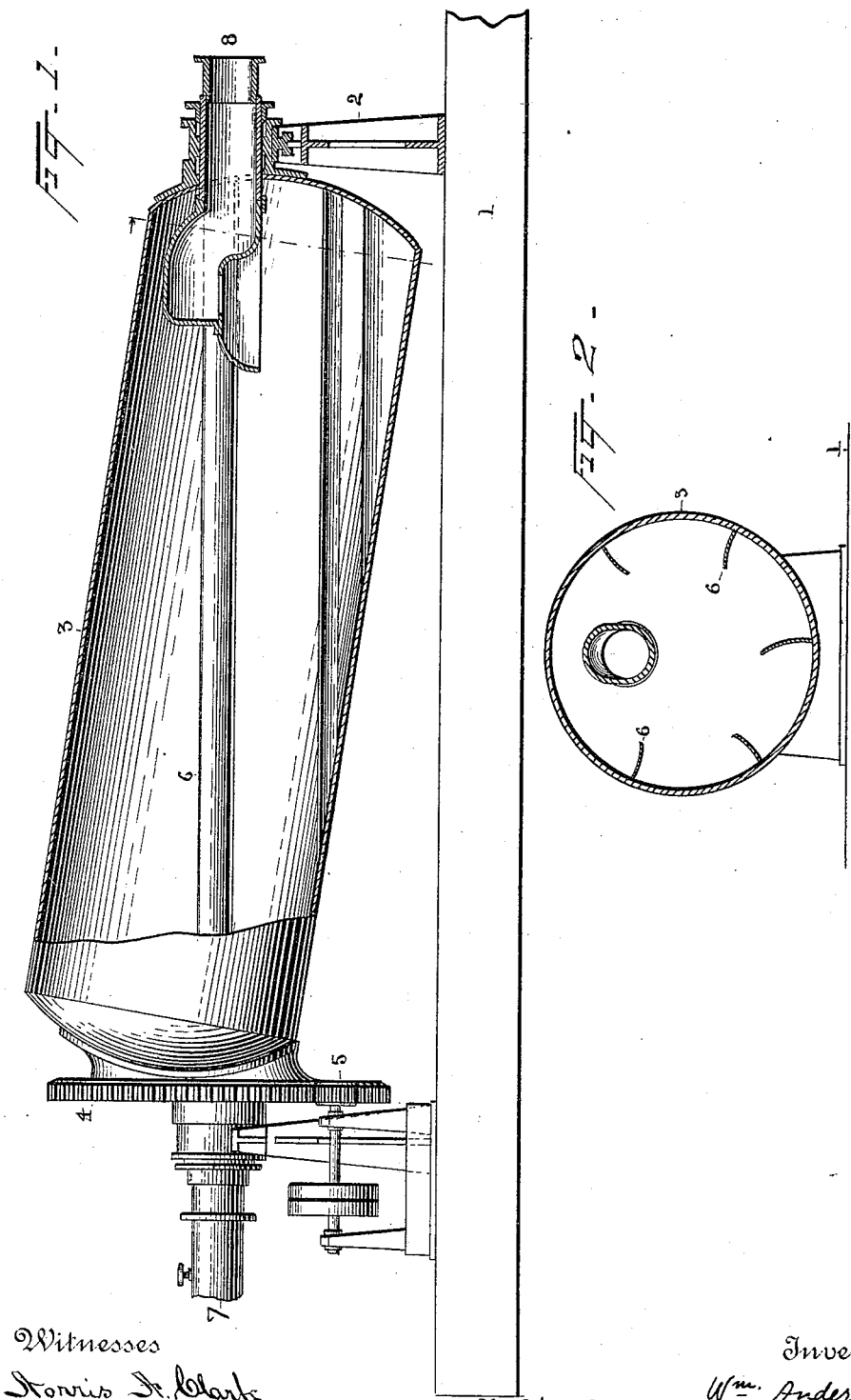

WILLIAM ANDERSON, OF ERITH, ASSIGNOR TO THE REVOLVING PURIFIER COMPANY, LIMITED, OF LONDON, ENGLAND.

ECCENTRIC REVOLVING WATER-PURIFIER.

SPECIFICATION forming part of Letters Patent No. 443,736, dated December 30, 1890.

Application filed April 25, 1890. Serial No. 349,483. (No model.)

*To all whom it may concern:*

Be it known that I, WILLIAM ANDERSON, of Erith, county of Kent, England, and a subject of the Queen of Great Britain, have invented a new Eccentric Revolving Water-Purifier, (Case C,) of which the following is a specification.

My invention relates to that class of devices in which water is purified by bringing it into intimate contact with spongy iron, iron filings, or other iron particles or purifying material, as fully set forth in an application of mine of even date herewith.

My apparatus is illustrated in the accompanying drawings, in which—

Figure 1 shows an elevation, partly in section thereof, and Fig. 2 shows a cross-section on line $x$ $x$.

1 1 is a suitable base, on which are standards 2 2, provided with journal-bearings for the eccentrically-mounted cylinder or drum 3. This cylinder is provided with gearing 4, which co-operates with the gear 5, which in turn is driven by any suitable power. On the inner face of the cylinder are several shelves 6, placed substantially parallel with the axis of revolution of the cylinder. These shelves may be curved or straight, and some of them will extend throughout the entire length of the cylinder, while others will be shorter, owing to the inclined position of the cylinder, as clearly indicated in the drawings. This apparatus would be operative, although not so efficient, if these shelves were omitted, for the cylinder would act as a tumbling-barrel, and would thus agitate the iron and bring it into intimate contact with the water. 7 is the water-inlet, and 8 the water-outlet.

In using the above apparatus the comminuted iron or other purifying material is placed in proper quantities, preferably about one-tenth filling the cylinder, along the bottom of the cylinder, which is then revolved, and water is admitted through suitable regulating-valves at 7, and is allowed to pass through the cylinder and out at 8. It will be understood that the flow of water is regulated so as to keep it in the cylinder in contact with the iron for several minutes—say from three to five. This I find ample for the purification of ordinary river-water. As the cylinder revolves, the shelves raise the purifying material, which, when it reaches or nearly reaches the highest point in its path, is showered down through the water.

By mounting the cylinder eccentrically the agitation of the water and iron is much more intense with each revolution of the cylinder than it would be were the cylinder horizontal, for not only is the iron raised by the shelves and showered down through the water, but the water washes lengthwise of the cylinder, back and forth, as the ends of the cylinder alternately rise and fall. This movement, being first in one direction and then in the opposite direction, will keep the purifying material distributed with sufficient uniformity along the length of the cylinder.

Having thus described my invention, what I claim is—

1. The combination, in a revolving water-purifier, of an eccentrically-mounted drum provided with water inlet and outlet and shelves on its inner face and comminuted purifying material therein, substantially as described.

2. The combination, in a water-purifier, of a cylinder or drum eccentrically mounted and containing purifying material, and means for revolving the cylinder, substantially as described.

This specification signed and witnessed this 14th day of February, 1890.

WILLIAM ANDERSON.

Witnesses:
 FRANCIS W. FRIGOUT,
 OLIVER R. JOHNSON,
*Consulate General U. S. A., at London, England.*